(12) United States Patent
Inaba

(10) Patent No.: US 7,997,715 B2
(45) Date of Patent: Aug. 16, 2011

(54) IMAGE FORMING APPARATUS WITH MECHANISM FOR ADJUSTING PRINTING DIRECTION

(75) Inventor: Michio Inaba, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1100 days.

(21) Appl. No.: 11/680,096

(22) Filed: Feb. 28, 2007

(65) Prior Publication Data

US 2007/0201927 A1 Aug. 30, 2007

(30) Foreign Application Priority Data

Feb. 28, 2006 (JP) ................................. 2006-052521

(51) Int. Cl.
*B41J 2/01* (2006.01)
*B41J 3/00* (2006.01)

(52) U.S. Cl. .......................................... 347/101; 347/5

(58) Field of Classification Search .................. 347/101; 400/62; 358/1.2, 1.15, 1.11, 1.1; 412/11; 399/82

See application file for complete search history.

(56) References Cited

U.S. PATENT DOCUMENTS

| | | | | |
|---|---|---|---|---|
| 5,031,116 A | * | 7/1991 | Shukunami et al. | 358/1.2 |
| 5,383,754 A | * | 1/1995 | Sumida et al. | 412/11 |
| 6,278,524 B1 | * | 8/2001 | Kujirai et al. | 358/1.11 |
| 6,646,758 B1 | * | 11/2003 | Anderson et al. | 358/1.15 |
| 2005/0031392 A1 | | 2/2005 | Yamamoto et al. | |
| 2005/0219555 A1 | * | 10/2005 | Onuma et al. | 358/1.1 |
| 2005/0237587 A1 | | 10/2005 | Nakamura | |
| 2006/0159480 A1 | * | 7/2006 | Mima et al. | 399/82 |

FOREIGN PATENT DOCUMENTS

| | | | |
|---|---|---|---|
| JP | 11-070705 | | 3/1999 |
| JP | 2000078394 | * | 3/2000 |
| JP | 2000-165653 A | | 6/2000 |
| JP | 2001-127946 A | | 5/2001 |
| JP | 2001127946 | * | 5/2001 |
| JP | 2002-103730 A | | 4/2002 |
| JP | 2004-056406 A | | 2/2004 |
| JP | 2005-062915 | | 3/2005 |
| JP | 2005-305867 | | 11/2005 |
| JP | 2005305685 | * | 11/2005 |

OTHER PUBLICATIONS

JP Office Action dtd Jan. 29, 2008, JP Appln. 2006-052521.

* cited by examiner

*Primary Examiner* — Stephen Meier
*Assistant Examiner* — Carlos A Martinez
(74) *Attorney, Agent, or Firm* — Banner & Witcoff, Ltd (57) ABSTRACT

An image forming apparatus is provided which includes a printing device, an image orientation identification device, a medium orientation identification device, a conversion device, and a prohibition device. The printing device prints an image represented by image data onto a recording medium. The image orientation identification device identifies orientation of an image represented by the image data. The medium orientation identification device identifies orientation of the recording medium for use in printing by the printing device. The conversion device converts the image data, when there is inconsistency between the orientation of the image identified by the image orientation identification device and the orientation of the recording medium identified by the medium orientation identification device, such that the orientations of the image and the recording medium are consistent with each other. The prohibition device prohibits operation of the conversion device under a predetermined condition.

15 Claims, 5 Drawing Sheets

```
TRAY SETTINGS (PAPER INFO)
    ├─ 1ST TRAY SETTINGS
    │      ├─ SIZE          : A4
    │      ├─ ORIENTATION: VERTICAL
    │      └─ MATERIAL      : PLAIN PAPER
    │
    └─ 2ND TRAY SETTINGS
           ├─ SIZE          : A5
           ├─ ORIENTATION: LATERAL
           └─ MATERIAL      : GLOSS PAPER
```

FIG. 3B

```
DIRECT PRINT SETTINGS
    ├─ PRINT PRECEDENT SETTINGS
    │      ├─ SETTINGS BY SIZE
    │      │      ├─ INDIVIDUAL DESIGNATION
    │      │      │      ├─ A4: SPEED PRECEDENT
    │      │      │      ├─ B5: SPEED PRECEDENT
    │      │      │      ├─ A5: SIZE PRECEDENT
    │      │      │      └─ L : SIZE PRECEDENT
    │      │      └─ THRESHOLD DESIGNATION
    │      │             └─ THRESHOLD SIZE (SIZE PRECEDENT MAXIMUM SIZE): A5
    │      └─ SETTINGS BY MATERIAL
    │             ├─ PLAIN PAPER : SPEED PRECEDENT
    │             └─ GLOSS PAPER: SIZE PRECEDENT
```

IMAGE FORMING APPARATUS WITH MECHANISM FOR ADJUSTING PRINTING DIRECTION

CROSS-REFERENCE TO RELATED) APPLICATIONS

This application claims the benefit of Japanese Patent Application No. 2006-52521 filed Feb. 28, 2006 in the Japan Patent Office, the disclosure of which is incorporated herein by reference.

TECHNICAL FIELD

This invention relates to an image forming apparatus that prints an image represented by image data onto a recording medium.

BACKGROUND

Conventional image forming apparatus are known to include a so-called direct print function. In direct printing, image data stored on an internal memory of a digital camera or on various storage media (external storage apparatus) detachably attached to the digital camera is directly read without an intermediary like a personal computer and printed.

In these type of image forming apparatus, orientation of an image (directions of broad and narrow sides of the image) represented by the image data is identified based on additional information contained in the read image data. Then, the image is rotated such that the orientation of the image is consistent with orientation of printing paper when printed.

SUMMARY

The present invention provides an image forming apparatus capable of automatically selecting a preferable printing manner.

DETAILED DESCRIPTION

General Overview

It is desirable that an image forming apparatus of the present invention includes a printing device, an image orientation identification device, a medium orientation identification device, a conversion device, and a prohibition device. The printing device prints an image represented by image data onto a recording medium. The image orientation identification device identifies orientation of the image represented by the image data. The medium orientation identification device identifies orientation of the recording medium for use in printing by the printing device. The conversion device converts the image data, when there is inconsistency between the orientation of the image identified by the image orientation identification device and the orientation of the recording medium identified by the medium orientation identification device, such that the orientations of the image and the recording medium are consistent with each other. The consistency of orientations here means that orientations of broad and narrow sides of the image are consistent with orientations of broad and narrow sides of the recording medium. The prohibition device prohibits operation of the conversion device under a predetermined condition.

Figure 1:
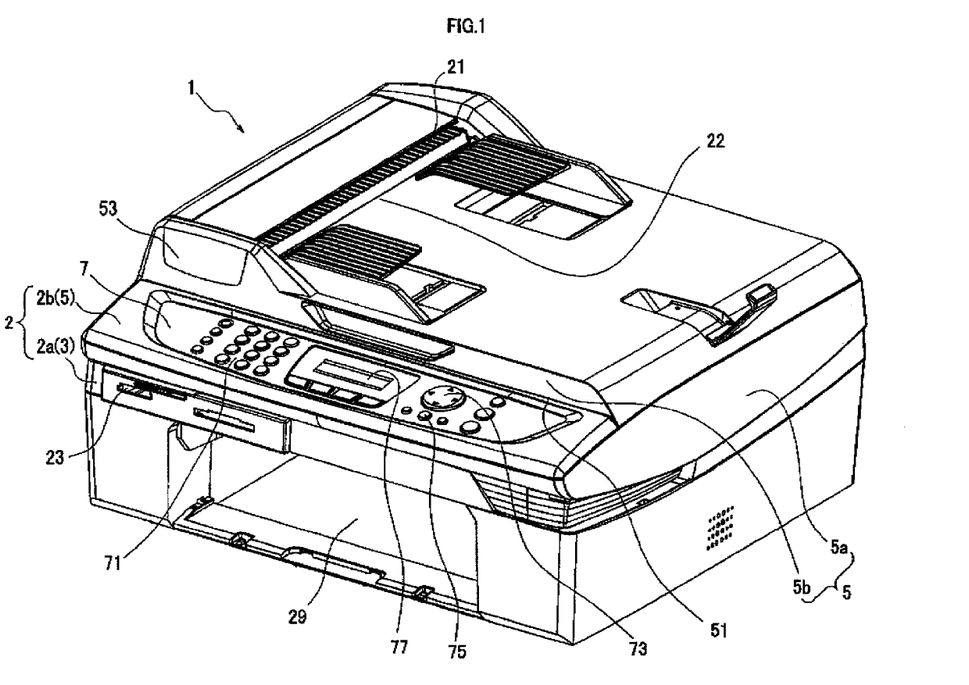
FIG. 1 is a perspective view of a multi function apparatus.

Illustrative Aspects
<Overall Structure of Multi Function Apparatus>
Referring to FIG. 1, a multi function apparatus 1 of the present embodiment includes a main body 2 having a clam shell structure with a lower body 2a and an upper body 2b. The upper body 2b is attached to the lower body 2a. The upper body 2b is capable of being opened and closed with respect to the lower body 2a. The lower body 2a incorporates an image forming portion 3 that functions as an ink jet printer. The upper body 2b incorporates an image reading portion 5 that functions as a scanner.

The image forming portion 3 in the lower body 2a accepts a sheet-like recording medium (paper in the present embodiment) from one of not shown two feed trays attached to the back side of the multi function apparatus 1. The image forming portion 3 forms an image onto a recording surface of the paper (in a manner of ink jet printing in the present embodiment). Then, the image forming portion 3 discharges the paper with the image printed thereon from a discharge opening 29 provided at the front side of the multi function apparatus 1.

Also, at the front side of the lower body 2a, there is provided an external memory interface (I/F) 23. The external memory I/F 23 includes a card slot for various storage media that are detachably attached to a digital camera or the like. The storage media store image data taken by the digital camera. Also provided at the lateral side or the back side of the lower body 2a are a parallel I/F 25 and a USB I/F 27 (see FIG. 2). The parallel I/F 25 includes a connector for input and output of image data to and from an external personal computer or the like via a parallel cable. The USB I/F 27 includes a connector for input and output of image data to and from an external device like a digital camera via a USB cable.

The image reading portion 5 in the upper body 2b, like the main body 2, has a clam shell structure with a reading member 5a and a cover member 5b. The cover member 5b is attached to the reading member 5a. The cover member 5b is capable of being opened and closed with respect to the reading member 5a.

A platen glass 51 made of a rectangular glass plate is provided on the upper surface of the reading member 5a. Below the platen glass 51, a not shown reading head is provided which can be moved along the platen glass 51. A document discharge opening 21 to which a document is discharged, and a document insertion opening 22 to which a document is inserted are provided on the upper surface of the cover member 5b. An auto feeder 53 is provided inside the cover member 5b. The auto feeder 53 conveys a document inserted from the document insertion opening 22 to the document discharge opening 21 by way of a not shown reading position.

That is, the image reading portion 5 is designed to be capable of reading either with a flatbed (FB) or an automatic document feeder (ADF). With the FB, reading is performed by moving the reading head and scanning an image from a document placed on the platen glass 51. With the ADF, reading is performed by moving a document between the document insertion opening 22 and the document discharge opening 21 and reading an image when the document passes the reading position of the stopped reading head.

An operation panel 7 is provided at the front side of the upper body 2b. The operation panel 7 is used for input of settings of various operation modes and commands with respect to a plurality of functions (in the present embodiment, a facsimile function, a scanner function, a copy function and a print function) of the multi function apparatus 1. The operation modes herein mean various conditions including execution steps and operation environments of the aforementioned functions.

The operation panel 7 is provided with buttons and switches for various inputs and settings, such as a numeric keypad 71, a cursor key 73, and a "Menu/Set" button 75. The numeric keypad 71 is used for input of numeric values. The cursor key 73 is used for selection of vertical and lateral directions. The "Menu/Set" button 75 is used to show an initial menu window displayed by default or to determine the operation modes. The operation panel 7 is also provided with a liquid crystal display (LCD) panel 77 which displays a menu window showing various menu items, user input and error indication.

That is, the user can operate these buttons and switches to display a menu window corresponding to a desired function on the LCD panel 77. Then, the user can select various menu items from the menu window so as to set the operation modes, input various commands, and switch the menu window.

<Structure of Control Portion>

Figure 2:
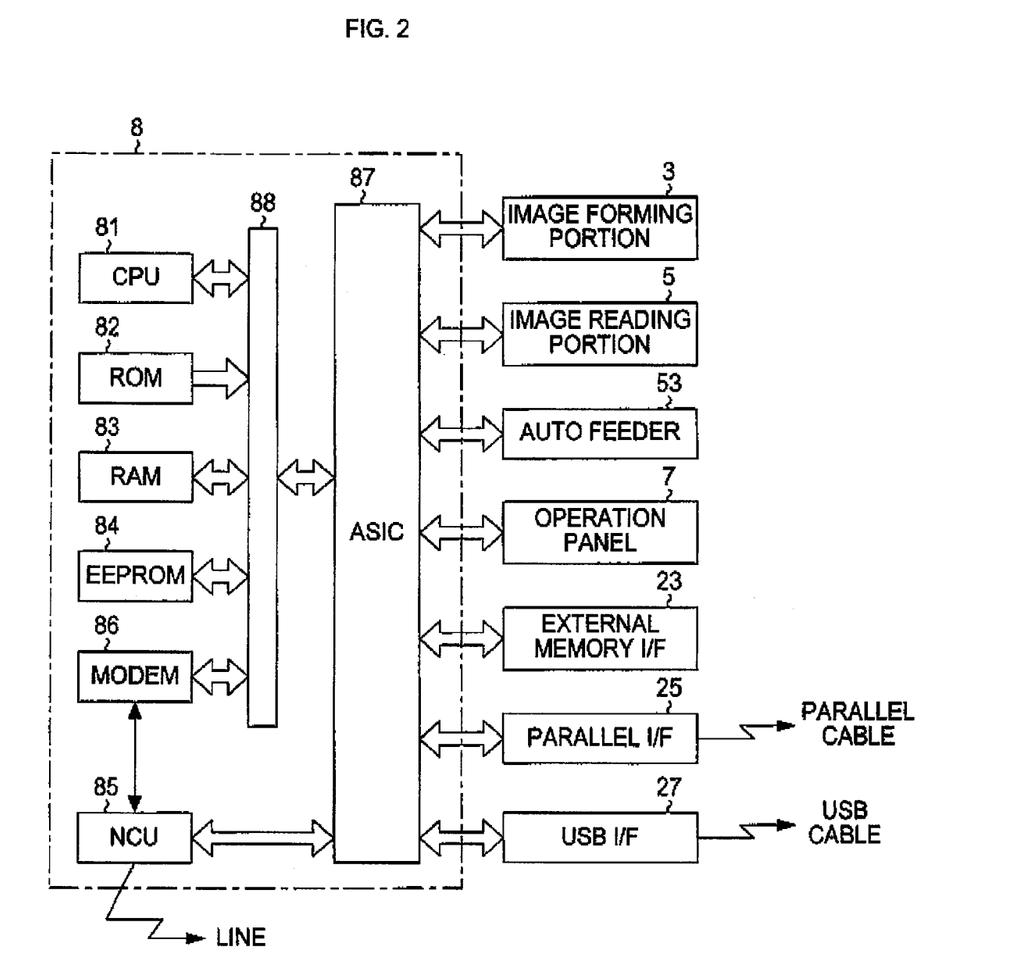
FIG. 2 is a block diagram showing a structure of a control portion which controls respective portions of the multi function apparatus.

Next, description is given for a control portion 8 controlling respective portions, like the aforementioned image forming portion 3 and image reading portion 5, of the multi function apparatus 1.

Referring to FIG. 2, the control portion 8 is mainly composed of a known microcomputer including a CPU 81, a ROM 82, and a RAM 83. In addition, the control portion 8 includes an EEPROM 84, a network control unit (NCU) 85, a modem 86, and an application specific integrated circuit (ASIC) 87 which are interconnected via a bus 88. The EEPROM 84 is a rewritable nonvolatile memory that stores setting parameters and various flags for operation control of the multi function apparatus 1. The NCU 85 and the modem 86 transmit and receive information to and from an external terminal via a general public line. The ASIC 87 controls input and output of various signals among the image forming portion 3, the image reading portion 5, the auto feeder 53, the operation panel 7, the external memory I/F 23, the parallel I/F 25, and the USB I/F 27.

The ROM 82 stores various programs such as a control program and a menu window display program. The control program controls operation of each portion of the multi function apparatus 1. The menu window display program controls display of a menu window. The ROM 82 further stores information such as settings, initial values, data, and lookup tables necessary for the programs.

The EEPROM 84 stores various setting information which is set at user discretion. Particularly, the EEPROM 84 stores at least tray settings and direct print settings. The tray settings indicate information regarding paper (paper information) stored in two feeding trays (first and second trays). The direct print settings indicate various information for use in later-explained direct printing. The EEPROM 84 also stores print mode settings (to be on or off) that indicate whether or not to perform printing such that orientation of an image is always consistent with orientation of paper in case that there is inconsistency of orientations between the image and the paper.

Figure 3A:
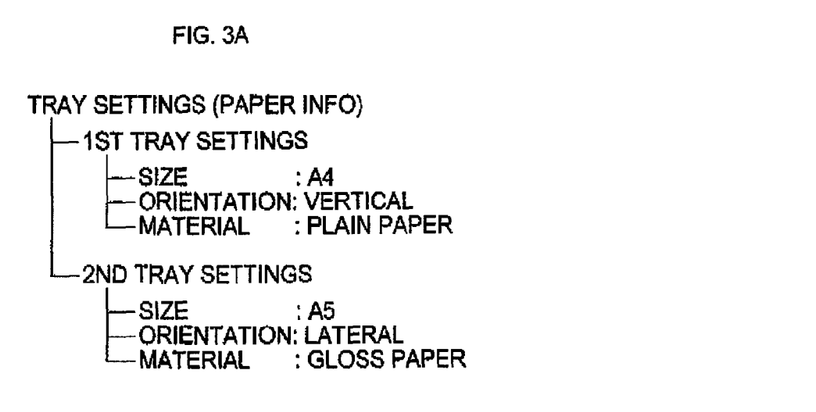
FIG. 3A is an explanatory view showing setting parameters of paper information.

As shown in FIG. 3A, the tray settings stores information on each of the first and the second trays, such as size (e.g., A4/B5/A5/L (photo size)), orientation (vertical/lateral) and material (plain paper/gloss paper/cardboard) of the paper stored on each of the trays.

FIG. 3A shows an example of the paper information set when plain paper of A4 size is stored vertically in the first tray while gloss paper of A5 size is stored laterally in the second tray. The paper and the image are in the form of rectangle. Orientations of the paper and the image are defined by orientations of their broad and narrow sides. The paper has a vertical orientation if the broad sides are parallel to a paper conveying direction. The paper has a lateral orientation if the narrow sides are parallel to the paper conveying direction. Also, it is defined that the paper and the image has the same orientation if the respective orientations of their broad and narrow sides are consistent with each other. Gloss paper is a kind of paper suitable for photo printing. The surface of the gloss paper is coated with specific chemicals in order to adjust ink absorption.

Figure 3B:
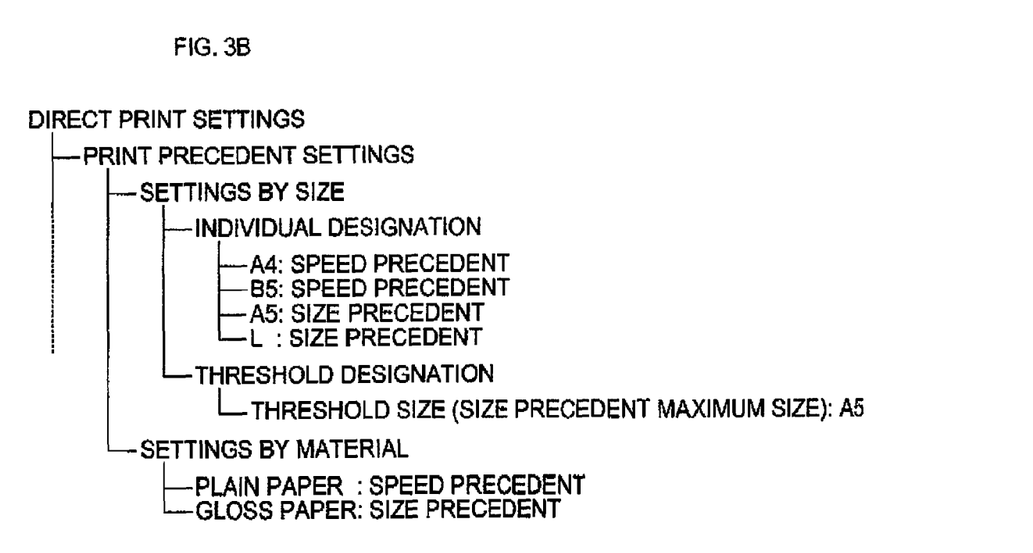
FIG. 3B is an explanatory view showing setting parameters of precedent information.

As shown in FIG. 3B, the direct print settings include a print precedent setting. The print precedent setting shows information on whether to perform printing as it is, that is, whether to perform printing in minimum time (hereinafter, referred to as "speed precedent printing"), or in a manner that the orientation of the image is consistent with the orientation of the paper (hereinafter, referred to as "size precedent printing"), when there is inconsistency between the orientation of the image and the orientation of paper at the time of direct printing.

In detail, the print precedent setting includes precedent information (speed precedent/size precedent) set in accordance with paper size or paper material. The precedent information shows whether to perform printing which prioritizes the printing speed or the size (appearance) of the image in order to print the image as large as possible.

In the case of the precedent information in accordance with paper size, there are two manners of setting, that is, individual designation and threshold designation. The individual designation allows setting per paper size. The threshold designation allows setting of only a maximum paper size to which size precedent printing is performed (or a minimum paper size to which speed precedent printing is performed). Whether to set the precedent information by the individual designation or the threshold designation can be separately selected by a user.

In the case of the precedent information in accordance with paper material, at least plain paper and gloss paper are provided for setting of the precedent information.

FIG. 3B shows an example of settings by paper size and settings by paper material. In the individual designation of the settings by paper size, printing speed is prioritized if the paper size is A4 or B5, while, image size is prioritized if the paper size is A5 or L. In the threshold designation, threshold size is set to be A5. In the settings by paper material, printing speed is prioritized in the case of plain paper, while image size is prioritized in the case of gloss paper.

The tray settings (paper information) and the print precedent settings of the direct print settings are set at discretion of a user operating the operation panel 7. The above settings may be arbitrarily set by a user operating a personal computer connected to the parallel I/F 25 via a parallel cable.

<Control by CPU>

The CPU 81 executes the menu window display program stored in the ROM 82 so as to urge a user to select the aforementioned paper information and precedent information via the operation panel 7 to set various operation modes. The CPU 81 also executes the control program in accordance with the set operation modes and commands inputted via the operation panel 7. As a result, the respective portions of the multi function apparatus 1 are controlled to execute the facsimile, scanner, copy and print functions.

Figure 4:
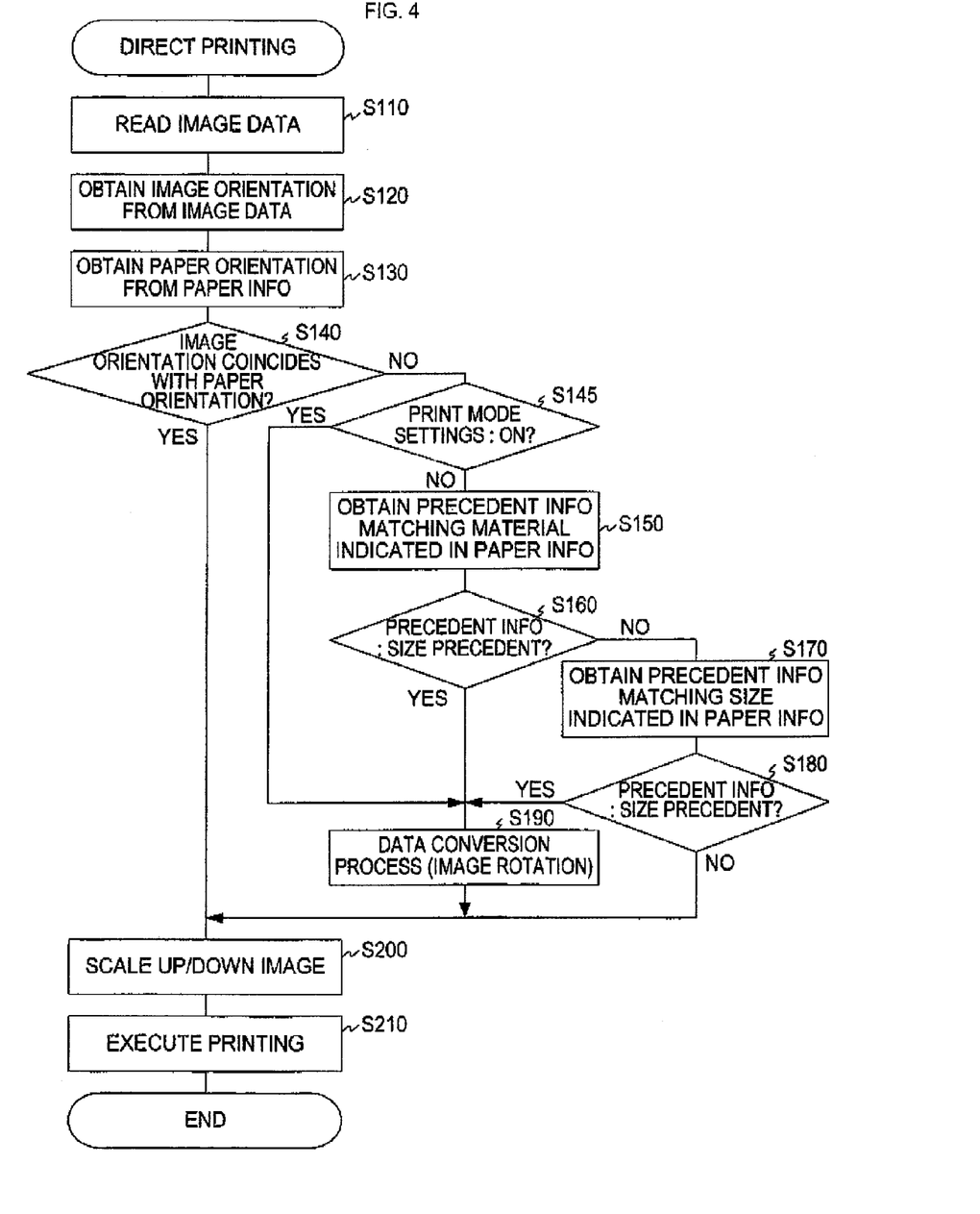
FIG. 4 is a flowchart illustrating steps of a direct print process.

Now, a direct printing process executed by the CPU 81 as one of the print functions will be explained by way of a flowchart shown in FIG. 4.

Figure 5A:
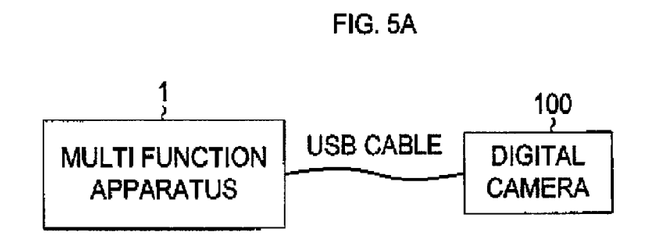
FIG. 5A is an explanatory view showing an execution environment of the direct print process.

The direct printing process is started when the following conditions are satisfied. As shown in FIG. 5A, firstly, a digital camera 100 is connected to the USB I/F 27 via a USB cable, or a storage medium detachably attached to the digital camera 100 is connected to the external memory I/F 23. Then, the operation panel 7 is operated to switch an operation mode of the multi function apparatus 1 to a mode to perform direct printing. A tray to feed paper is also selected. A print start command is inputted.

When the process is started, the CPU 81 firstly reads image data from the storage medium via the external memory I/F 23 or from the digital camera 100 via the USB I/F 27 (S110). Then, information is obtained on length and width of an image to be generated based on the read image data in order to identify orientation of the image (S120). The information on the length and the width of the image can be defined by the number of pixels, for example. Also, information is obtained from the paper information stored in the EEPROM 84 on orientation of the paper in the feed tray for use in printing (S130).

It is then determined whether the orientation of the image identified by the length and the width of the image is consistent with the orientation of the fed paper (S140). If the orientations of the image and the paper are consistent with each other (S140: YES), the image is scaled up or down in accordance with the size of the paper based on the paper information stored in the EEPROM 84 (S200). Printing is performed (S210) to end the process.

If the orientations of the image and the paper are inconsistent with each other (S140: NO), the process moves to S145 to determine whether the print mode settings stored in the EEPROM 84 are on. If the print mode settings are off (S145: NO), precedent information corresponding to paper material is obtained based on information on material of the paper from the paper information stored in the EEPROM 84 (S150). It is determined whether the obtained precedent information is size precedent (S160).

If the precedent information is not size precedent, that is, if it is determined that the precedent information is speed precedent (S160: NO), precedent information corresponding to paper size is obtained based on the size of the paper from the paper information (S170). It is then determined whether the obtained precedent information is speed precedent (S180).

If the precedent information is not size precedent, that is, if it is determined that the precedent information is speed precedent (S180: NO), the image is scaled up or down in accordance with the paper size based on the paper information (S200) without changing the orientation of the image. Printing is performed (S210) with inconsistent orientations of the image and the paper.

If it is determined that the print mode settings are on in S145 (S145: YES) or the precedent information is size precedent in either S160 or S180 (S160 or S180: YES), a data conversion process is executed in which the image is rotated by 90° so that the orientation of the image is consistent with the orientation of the paper (S190). The image is scaled up or down in accordance with the paper size based on the paper information (S200) with consistent orientations of the image and the paper. Printing is performed (S210) to end the process.

That is, when the print mode settings are off, printing is performed as follows.

Figure 5B:
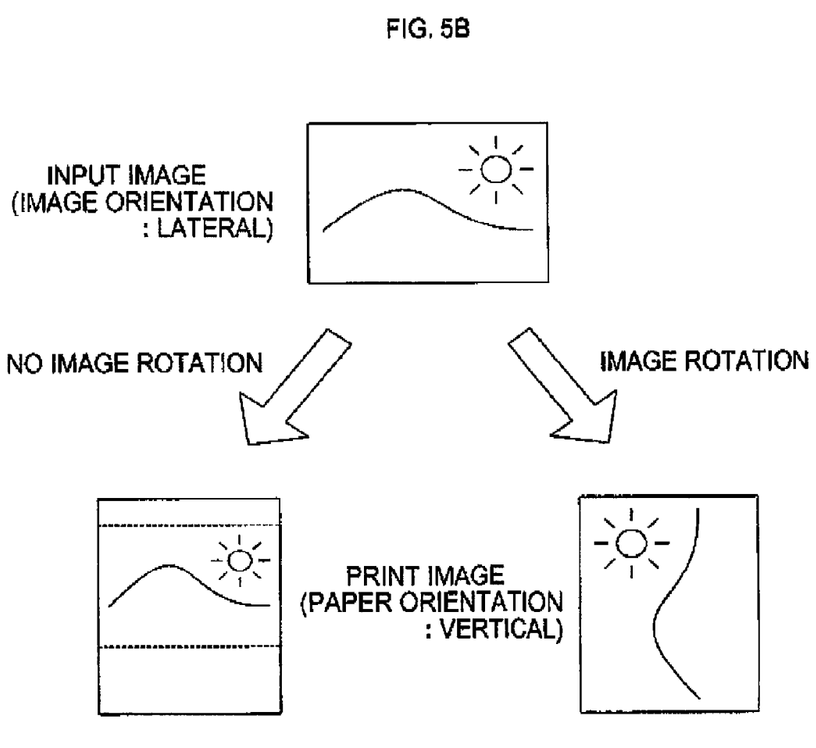
FIG. 5B is an explanatory view showing a difference of print results depending on execution or nonexecution of a data conversion process.

In the case of inconsistency between the orientation of the paper and the orientation of the image, if the precedent information corresponding to either paper size or paper material for use in printing is size precedent, an image rotation process is performed as shown in the lower right position of FIG. 5B, so that printing is performed with consistent orientations of the image and the paper (size precedent printing). Also, if the precedent information corresponding to both paper size and paper material is speed precedent, the image rotation process is not performed as shown in the lower left position of FIG. 5B. Printing is performed with inconsistent orientations of the image and the paper (speed precedent printing).

Scaling up and down of the image is performed as follows.

A ratio of the width of the paper to the width of the image is defined as a lateral magnification (=paper width/image width). A ratio of the length of the paper to the length of the image is defined as a vertical magnification (=paper length/image length). After the orientation of the image to be printed is confirmed, the image data is converted based on the above magnifications so that the image is fit to the paper size. That is, in case that the smaller of the lateral magnification and the vertical magnification is more than "1", both the width and the length of the image are scaled up by the smaller of the magnifications. On the other hand, in case that the smaller of the magnifications is less than "1", both the width and the length of the image are scaled down by the smaller of the magnifications.

In the above, the width of the paper and the image is represented by the number of pixels in a direction orthogonal to the paper conveying direction. The length of the paper and the image is represented by the number of pixels in a direction parallel to the paper conveying direction.

<Effects>

As noted above, in the multi function apparatus 1, the data conversion process (i.e., process of converting the orientation of the image to be consistent with the orientation of the paper) is not always performed even when there is inconsistency between the orientation of the image identified from the read image data and the orientation of the paper for use in printing at the time of direct printing. Only if the size and the material of the paper correspond to the paper size and the paper material set as size precedent in the precedent information, size precedent printing is performed which allows execution of the data conversion process. Otherwise, the speed precedent printing is performed which prohibits execution of the data conversion process.

According to the multi function apparatus 1, printing can be always performed in a desirable manner depending on types of the paper by setting the precedent information either as size precedent or as speed precedent. The types of paper (in the present embodiment, paper of small sizes like A5 and L or of the materials for photos like gloss paper) requiring the image to be printed in the maximum size with respect to the paper may be set as size precedent. The types of paper requiring the printing speed to be prioritized may be set as speed precedent.

Furthermore, in the multi function apparatus 1, the paper information and the precedent information are designed to be set by a user via the operation panel 7. Accordingly, an extra sensor is not necessary to obtain the paper information. Also, the user can arbitrarily designate the printing manner depending on the types of paper.

In the case of small sized printing paper, it is desirable that the image is printed as large as possible so the printed image can be easily seen. Therefore, consistency between the orientation of the image and the orientation of the paper is necessary. According to the multi function apparatus 1, the threshold designation can be selected which allows setting of only the maximum paper size to which the size precedent printing is performed (or the minimum paper size to which the speed precedent printing is performed) as the threshold size. Thus, the orientation of the image can be made consistent with the orientation of the paper by simple operation, when printing is performed to the paper of smaller sizes than the predetermined size.

Gloss paper is generally considered to be used for photo printing. Also, in photo printing, it is very likely that size precedent printing is preferred to speed precedent printing. According to the multi function apparatus 1, plain paper and gloss paper are provided for settings by paper material. Printing can be achieved in a manner which is suitable to user demands.

<Other Aspects>

An aspect of the present invention is described in the above. However, it should be noted that the present invention can be practiced in various manners without departing from the scope of the present invention.

For instance, in the above aspect, the present invention is applied to the multi function apparatus 1. However, the present invention may be applied to any apparatus having a printer function and an interface for directly reading image data from a digital camera or a storage medium.

In the above aspect, A4/B5/A5/L sizes are provided as paper size. However, if paper has a rectangular form, the paper size may be set by the length of either of the broad side or of the narrow side, or by the area (broad side length×narrow side length) of paper.

Also in the above aspect, the type of paper is identified based on paper size and paper material stored in the tray settings. The data conversion process is not performed if precedent information corresponding to the identified type of paper is not found as size precedent. However, whether or not to execute the data conversion process may not be necessarily dependent on the type of paper. For example, the data conversion process may be designed not to be executed for a predetermined time or to a predetermined type of image data, based on an input command by a user.

Moreover, in the above aspect, printing is performed by scaling up or down the image based on the size of paper for use in printing. However, printing may be performed, for example, by reducing the number of pixels based on the size of paper for use in printing.

What is claimed is:

1. An image forming apparatus comprising:
   a printing device that prints an image represented by image data onto a recording medium;
   at least one processor; and
   a memory storing computer readable instructions that when executed cause the image forming apparatus to perform the steps of:
      identifying an orientation of the image represented by the image data;
      identifying an orientation of the recording medium for use in printing by the printing device;
      determining if there is an inconsistency between the orientation of the image and the orientation of the recording medium;
      converting the image data, when there is inconsistency between the identified orientation of the image and the identified orientation of the recording medium, such that the orientations of the image and the recording medium are consistent with each other; and
      prohibiting conversion of the image data while allowing the printing to be performed in a current state when it is determined that there is an inconsistency between the orientation of the image and the orientation of the recording medium, under a predetermined condition,
   wherein when it is determined that there is inconsistency between the orientation of the image and the orientation of the recording medium, the image forming apparatus is configured to determine, based upon predetermined setting information, whether to perform printing in the current state, or whether to perform printing in a state in which the orientation of the image is consistent with the orientation of the recording medium, and then print the image in the current state, or in the state in which the orientation of the image is consistent with the orientation of the recording medium, in accordance with the setting information,
   wherein the memory stores computer readable instructions that when executed further cause the image forming apparatus to perform the step of:
      selecting whether to prohibit conversion of the image data while allowing the printing to be performed in the current state when it is determined that there is an inconsistency between the orientation of the image and the orientation of the recording medium; and
      the selection of whether or not to prohibit rotation of the image is performed based on previously set or stored information.

2. The image forming apparatus according to claim 1, wherein the memory stores computer readable instructions that when executed further cause the image forming apparatus to perform the step of:
   identifying a type of the recording medium for use in printing by the printing device based on at least one predetermined determination parameter,
   wherein conversion of the image data is prohibited when the type of the recording medium identified by the identifying the type of the recording medium is other than a predetermined conversion target type.

3. The image forming apparatus according to claim 2, wherein one of the at least one determination parameter is size of the recording medium.

4. The image forming apparatus according to claim 3, wherein the image forming apparatus regards the recording medium of a smaller size than a predetermined threshold size as the conversion target type.

5. The image forming apparatus according to claim 3, wherein the printing device prints the image represented by the image data that is converted to correspond to the size of the recording medium identified by the identifying the type of the recording medium.

6. The image forming apparatus according to claim 5, wherein the memory stores computer readable instructions that when executed further cause the image forming apparatus to perform the step of:
   converting the image data such that the overall image is printed as large as possible on the recording medium.

7. The image forming apparatus according to claim 2, wherein one of the at least one determination parameter is material of the recording medium.

8. The image forming apparatus according to claim 2, wherein the image forming apparatus regards photo paper as the conversion target type.

9. The image forming apparatus according to claim 2,
wherein the at least one determination parameter is a plurality of determination parameters, and
the identifying the type of the recording medium is based on at least one of the plurality of determination parameters.

10. The image forming apparatus according to claim 2, wherein the memory stores computer readable instructions that when executed further cause the image forming apparatus to perform the step of:
allowing external setting of a type of a specific recording medium as the conversion target type.

11. The image forming apparatus according to claim 10, wherein the allowing uses one of a plurality of predetermined setting manners of the conversion target type to set a type of a specific recording medium as the conversion target type.

12. The image forming apparatus according to claim 2, wherein the identifying includes identifying the type of the recording medium for use in printing from externally input information.

13. The image forming apparatus according to claim 1, wherein the identifying includes identifying the orientation of the recording medium for use in printing from externally inputted information.

14. The image forming apparatus according to claim 1, further comprising
an input device configured to input the image data,
wherein the printing device prints the image represented by the image data inputted by the input device onto the recording medium.

15. The image forming apparatus according to claim 14, wherein the input device is used to input the image data from an external storage device that is detachably attached to the image forming apparatus.

* * * * *